US009210687B1

(12) United States Patent
Reeves et al.

(10) Patent No.: US 9,210,687 B1
(45) Date of Patent: Dec. 8, 2015

(54) MANAGEMENT OF WIRELESS SERVICE IN A DUAL RAN ARRANGEMENT

(71) Applicant: Sprint Spectrum L.P., Overland Park, KS (US)

(72) Inventors: Raymond E. Reeves, Oviedo, FL (US); Simon Youngs, Overland Park, KS (US); Mark Peden, Olathe, KS (US); Gary Koller, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 44 days.

(21) Appl. No.: 14/036,399

(22) Filed: Sep. 25, 2013

(51) Int. Cl.
*H04W 4/00* (2009.01)
*H04W 68/02* (2009.01)
*H04W 36/00* (2009.01)

(52) U.S. Cl.
CPC .......... *H04W 68/02* (2013.01); *H04W 36/0016* (2013.01); *H04W 36/00* (2013.01); *H04W 36/0005* (2013.01)

(58) Field of Classification Search
CPC .................. H04W 36/0016; H04W 36/0022; H04W 36/0027; H04W 60/005; H04W 72/1215; H04W 88/06; H04W 36/0005; H04W 36/00; H04W 68/02

USPC ................. 455/434, 436, 438, 439, 442, 450, 455/452.1

See application file for complete search history.

(56) References Cited

U.S. PATENT DOCUMENTS

| 8,391,858 B1* | 3/2013 | Vargantwar et al. ....... 455/432.1 |
|---|---|---|
| 2003/0191826 A1* | 10/2003 | Bellinger et al. ............. 709/220 |
| 2008/0220869 A1* | 9/2008 | Midgley et al. ................ 463/40 |
| 2011/0149853 A1* | 6/2011 | Olsson et al. ................. 370/328 |
| 2011/0149908 A1 | 6/2011 | Olsson et al. |
| 2011/0195713 A1* | 8/2011 | Ramasamy et al. .......... 455/434 |
| 2011/0270973 A1* | 11/2011 | Liao .............................. 709/224 |
| 2012/0270551 A1* | 10/2012 | Hu ................................ 455/436 |
| 2014/0010202 A1* | 1/2014 | Maia Neves et al. ......... 370/331 |
| 2014/0348029 A1* | 11/2014 | Lee et al. ...................... 370/259 |
| 2014/0355428 A1* | 12/2014 | Smith et al. .................. 370/230 |

* cited by examiner

*Primary Examiner* — Jean Gelin (57) ABSTRACT

Disclosed is a method and system to help manage wireless service in a scenario where a UE is served by a first RAN and begins being served by a second RAN. In accordance with the disclosure, a determination may then be made of whether the UE will likely engage in at least a threshold extent of scanning for coverage of the first RAN while the UE is being served by the second RAN. If the determination is affirmative, the UE may then be caused to not scan for coverage of the first RAN while the UE is being served by the second RAN. Whereas, if the determination is negative, the UE may be allowed to scan for coverage of the first RAN while the UE is being served by the second RAN.

20 Claims, 4 Drawing Sheets

MANAGEMENT OF WIRELESS SERVICE IN A DUAL RAN ARRANGEMENT

BACKGROUND

Unless otherwise indicated herein, the materials described in this section are not prior art to the claims and are not admitted to be prior art by inclusion in this section.

In a typical market area, wireless service providers may operate radio access networks (RANs) each arranged to provide user equipment devices (UEs) such as cell phones, tablet computers, tracking devices, embedded wireless modules, and other wirelessly equipped communication devices, with wireless communication service. Each such a RAN may include a number of base stations that radiate to define wireless coverage areas in which to serve UEs according to an air interface protocol such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1xRTT and 1xEV-DO), GSM, GPRS, UMTS, EDGE, iDEN, TDMA, AMPS, MMDS, WIFI, and BLUETOOTH, or others now known or later developed. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station or by other base stations.

In general, each base station in a RAN may be configured to operate on one or more frequency bands and, in each such band, to provide service on one or more frequency channels. Example frequency bands, each defining a particular range of radio frequency spectrum, include the 800 MHz band, the 1.9 GHz band, and the 2.5 GHz band. Each frequency channel in a band may then be arranged as a specific block of frequency, such as a 1.25 MHz block, a 5 MHz block, a 10 MHz block, or the like. Further, in certain systems, each frequency channel may include one block of frequency for downlink communications from the RAN to UEs and a corresponding but separate block of frequency for uplink communications from UEs to the RAN. Whereas, in other systems, each frequency channel may be divided over time to separately carry downlink and uplink communications.

To enable UEs to select coverage areas in which to operate, each base station may also be configured to broadcast a specification of the one or more frequency channels on which it operates and to broadcast on each such frequency channel one or more pilot or reference signals that UEs are configured to monitor in order to evaluate coverage strength (e.g., signal strength and/or signal to noise ratio). For example, in a representative LTE system, each base station broadcasts on each of its one or more frequency channels a system information block (SIB) message that lists the frequency channels on which the base station provides service, and each base station further broadcasts on each listed frequency channel a reference signal that LTE-compliant UEs are arranged to monitor in order to evaluate LTE coverage provided by the base station. Similarly, in a representative CDMA system, each base station broadcasts on each of its one or more frequency channels a channel list message (CLM) that lists the frequency channels on which the base station provides service, and each base station further broadcasts on each listed frequency channel a pilot signal that CDMA-compliant UEs are arranged to monitor in order to evaluate CDMA coverage provided by the base station.

When a UE first enters into coverage of a RAN, the UE may automatically scan the airwaves in an effort to find the strongest available coverage, and the UE may then register with the RAN. For instance, the UE may generally scan through various frequency channels and evaluate any reference signals on those frequency channels, and the UE may determine which reference signal is the strongest, thereby identifying an optimal frequency channel and base station coverage area. The UE may then engage in registration signaling with the RAN on that frequency channel in that base station coverage area, to register with the RAN.

Once a UE is registered with a RAN in a particular coverage area, the UE may then be served by the RAN in that coverage area in an "idle" mode in which the UE regularly scans for page messages and other overhead information from the RAN. Further, the UE may engage in additional signaling with the RAN in order to be served by the RAN in an "active" or "connected" mode in which the UE may then engage in bearer communication, such as voice and/or packet-data communication with other entities as discussed above.

While a UE is served by a RAN in the idle or active/connected mode, the UE may also continue to scan the airwaves to help ensure that the UE continues to operate with the most optimal coverage. For instance, the UE may continue to evaluate the reference signal of the UE's currently serving frequency channel and coverage area, and if that reference signal becomes threshold weak, the UE may begin to scan for coverage on one or more other frequency channels of that coverage area and/or on one or more frequency channels of one or more other coverage areas that the UE can detect. Alternatively, the UE may regularly engage in such scanning for other coverage without first detecting threshold weak coverage on its currently serving frequency channel. In the event the UE finds sufficiently strong other coverage, such as another frequency channel and/or other coverage area, the UE may then transition to be served by the RAN in that other coverage.

Many market areas today also include two or more such RANs arranged to operate according to different air interface protocols. In such areas, UEs may then be configured as multi-mode devices, arranged to support service according to various air interface protocols and thus arranged to be served by more than one RAN in the area. By way of example, a given market area may include both an LTE RAN operated by one wireless service provider and a CDMA RAN operated by the same or another wireless service provider, and UEs in the area may be configured to support both LTE service and CDMA service. Such a UE may be configured to support service by just one such RAN at a time or may be configured to support service concurrently by both RANs.

With such an arrangement, while a UE is being served by one RAN in the idle or active/connected mode, the UE may begin being served by another RAN. This may occur, for example, if the two RANs support different types of services and the UE is served by just one RAN currently but, to engage in another service, needs to begin being served by the other RAN, or for other reasons. In the LTE/CDMA arrangement, for instance, LTE generally supports data communication including in some cases packet-based voice calling, and CDMA supports legacy circuit-switched voice calling. Thus, if a UE is currently being served by an LTE RAN for data service and seeks to engage in a legacy voice call, the UE may scan for and begin being served by a CDMA network in order to engage in that voice call.

Without limitation, a specific example of this process is known in the industry as circuit-switched fallback (CSFB). With CSFB, a UE may be registered with and served in an idle or active/connected mode by a first RAN, and the UE may also be registered with a co-located second RAN but not currently served by that second RAN. While the UE is served by the first RAN, signaling between the UE and the second RAN may then pass through the first RAN, to cause the UE to begin being served by the second RAN. For instance, in an example LTE/CDMA arrangement, when the UE is registered with and served by the LTE RAN, the UE may engage in CSFB signaling with the LTE RAN via the LTE air interface, and the LTE network may pass that signaling along to the CDMA network. When appropriate, the UE may then scan for optimal CDMA coverage and may enter into an active/connected mode served by the CDMA RAN, to engage in the CSFB call via the CDMA air interface.

OVERVIEW

When a UE is being served by a first RAN and the UE begins to be served by a second RAN, if the UE supports concurrent service by both RANs, the UE may engage in such concurrent service. In the example arrangement discussed above, for instance, if a UE supports concurrent LTE service and CDMA service and the UE is presently being served by the LTE RAN, the UE may begin to be served by the CDMA RAN while the UE continues to be served concurrently by the LTE RAN.

As part of such concurrent service, the UE may operate as discussed above by continuing to scan for optimal coverage of the first RAN. Thus, in the example arrangement, while the UE is engaged in a CDMA call such as a CSFB call for instance, if the UE is still served in an idle or active/connected mode by the LTE network, the UE may continue to scan for optimal LTE coverage. In line with the discussion above, for example, the UE may regularly scan various LTE frequency channels of the UE's currently serving LTE coverage area and/or of one or more other LTE coverage areas that may exist at the UE's location. Further, if and when the UE finds such other LTE coverage, the UE may engage in signaling with the LTE network to transition to be served in such other LTE coverage.

Depending on the extent to which the UE may engage in such scanning for coverage of the first RAN while the UE is served by the second RAN, a drawback of such scanning is increased battery power consumption.

For example, the act of the UE tuning from one frequency channel to another for scanning the airwaves in search of reference signals provided by the first RAN may use a fair amount of the UE's battery power. In the event the first RAN has many such frequency channels at the UE's current location, such as in the coverage area currently serving the UE and/or in one or more adjacent coverage areas of the first RAN, the UE may thus likely engage in a great extent of such scanning, and therefore use more battery power. Whereas, if the first RAN has just one or relatively few such frequency channels at the UE's location, the UE may likely engage in a much lesser extent of such scanning and therefore use less battery power.

Furthermore, in an arrangement where threshold low coverage strength from the UE's serving coverage area in the first RAN would cause the UE to begin scanning for better coverage of the first RAN, the UE may be more likely to engage in such scanning as the UE's coverage strength of the first RAN is lower. Thus, the lower the UE's current signal strength from the first RAN, the more likely the UE may be to engage in scanning for better coverage of the first RAN, and the more battery power the UE may use.

Accordingly, disclosed herein is a method to help manage wireless service in a scenario where a UE is served by a first RAN and begins being served by a second RAN. In accordance with the disclosure, a determination may then be made of whether the UE will likely engage in at least a threshold extent of scanning for coverage of the first RAN. If the determination is affirmative, the UE may then be caused to not scan for coverage of the first RAN while the UE is being served by the second RAN. (Further, this status may change later while the UE is being served by the second RAN, such as when the UE is going to stop being served by the second RAN and may thus need to scan for coverage of the first RAN.) Whereas, if the determination is negative, the UE may be allowed to scan for coverage of the first RAN while the UE is being served by the second RAN.

In one respect, for instance, disclosed is an example method that may be carried out by a UE being served by a first RAN or may be carried out by another entity such as a controller of the first RAN for example. While a UE is being served by a first RAN according to a first air interface protocol, the method involves detecting that the UE begins to be served by a second RAN according to a second air interface protocol different than the first air interface protocol. Further, the method involves, responsive to that detecting, making a determination, based at least in part on a quantity of frequency channels defined by the first RAN, of whether the UE will likely engage in at least a threshold extent of scanning for coverage of the first RAN while the UE is being served by the second RAN.

The method then involves, if the determination is that the UE will likely engage in at least the threshold extent of scanning for coverage of the first RAN while the UE is being served by the second RAN, then causing the UE to not scan for coverage of the first RAN while the UE is being served by the second RAN. Whereas, the method involves, if the determination is that the UE will not likely engage in at least the threshold extent of scanning for coverage of the first RAN while the UE is served by the second RAN, then allowing the UE to scan for coverage of the first RAN while the UE is being served by the second RAN.

In another respect, disclosed is an example UE that includes a first radio, a second radio, and a controller. The first radio is configured for the UE to be served by a first RAN according to a first air interface protocol, in which case the first radio scans for coverage of the first RAN. The second radio is configured for the UE be served by a second RAN according to a second air interface protocol different than the first air interface protocol. And the controller may comprise a programmed processor and/or other logic configured to manage operation of at least the first radio.

In practice, the controller is configured to detect, while the UE is served by the first RAN, that the UE begins to be served by the second RAN. Further, the controller is configured to respond to that detecting by (i) making a determination of whether a quantity of frequency channels defined by the first RAN is at least a threshold quantity, and (ii) based at least in part on that determination being affirmative, stopping the first radio from scanning for coverage of the first RAN.

Further, in still another respect, disclosed is an example control server in a first RAN. The control server includes a processing unit, data storage, and program instructions stored in the data storage and executable by the processing unit to carry out various functions including (i) detecting that a UE being served by the first RAN begins being served by a second RAN, (ii) responsive to the detecting, making a determination of whether a quantity of frequency channels defined by the first RAN at a current location of the UE is at least a threshold quantity, and (iii) responsive to the determination being affirmative, causing the UE to stop being served by the first RAN.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Principles of the present disclosure may be usefully applied in various scenarios involving a first RAN and a second RAN, where a UE that is being served by the first RAN begins to be served by the second RAN. An example of such a scenario is that discussed above, where a UE is served by an LTE RAN and begins to be served by a CDMA RAN, such as to engage in a voice call (e.g., CSFB call) served by the CDMA RAN. For simplicity of illustration, the present description will focus on that example scenario. But it should be understood that the principles described herein can be applied in numerous other scenarios as well, involving any of a variety of other types of RANs, air interface protocols, UEs, and so forth.

Referring to the drawings, as noted above, FIG. 1 is a simplified block diagram of a representative wireless communication system. As shown, the representative system includes an LTE RAN 12 and a CDMA RAN 14. In operation, the LTE RAN primarily serves UEs with wireless packet data communication service (including perhaps voice-over-packet and other packet-based real-time media service) according to the LTE air interface protocol, and the CDMA RAN primarily serves WCDs with circuit-switched voice call service (but may also provide packet-data communication service and other types of service) according to the CDMA air interface protocol.

Figure 1:
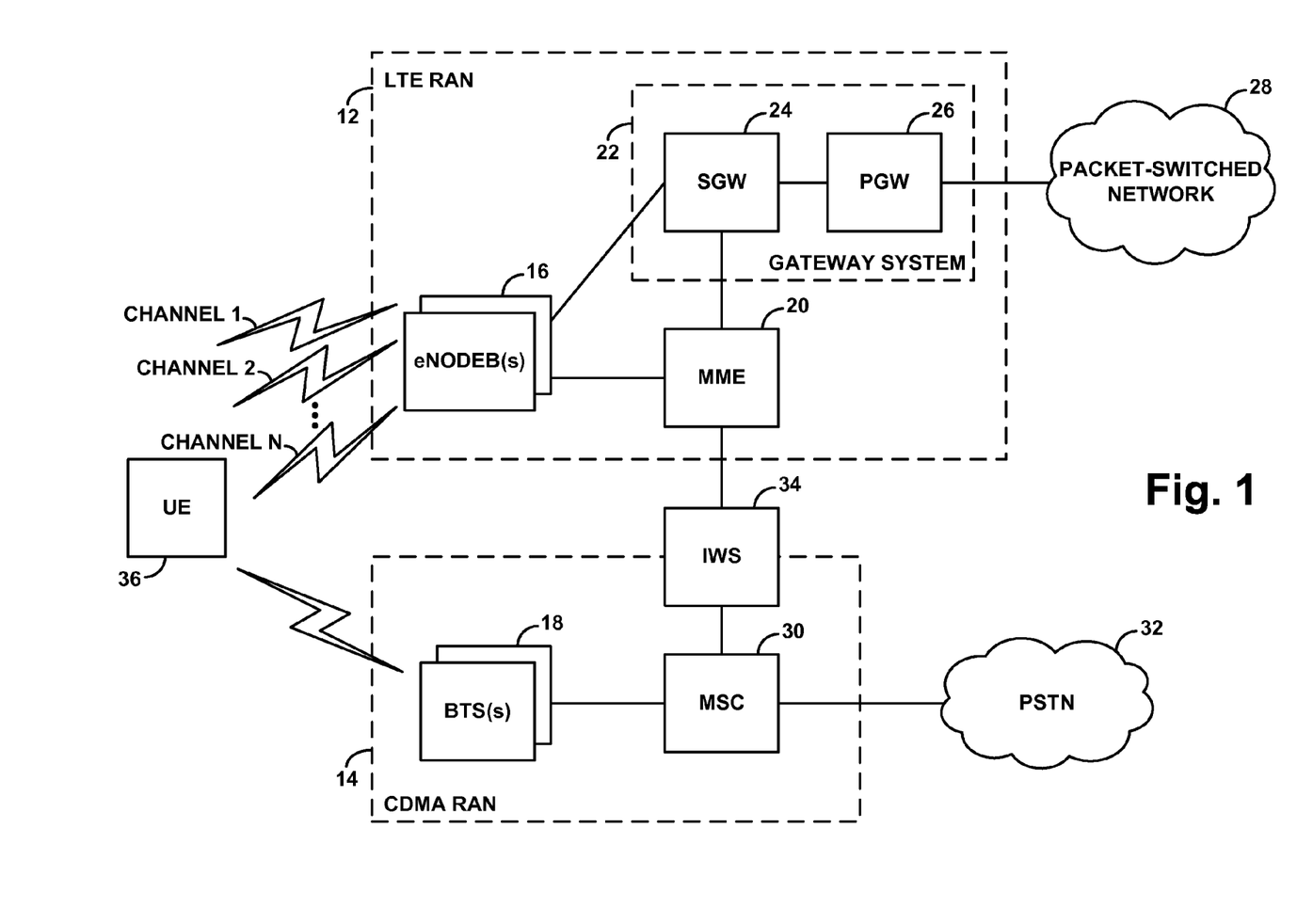
FIG. 1 is a simplified block diagram of an example wireless communication system in which the present disclosure can be implemented.

Each of these RANs may include one or more base stations that radiate to provide one or more respective coverage areas in which to serve UEs. By way of example, the LTE RAN 12 is shown including one or more representative LTE base stations 16 known as eNodeBs, and the CDMA RAN is shown including a representative CDMA base station 18 known as a base transceiver station (BTS).

As discussed above, each such base station may operate on one or more frequency channels, possibly the same frequency channel or channels in each of its coverage areas if it provides more than one coverage area. Thus, by operation of one or more such base stations, each RAN may define one or more frequency channels on which to serve UEs. In the example arrangement, for instance, the LTE RAN 12 is shown defining a number of frequency channels denoted as Channels 1, 2, . . . N, and the CDMA RAN 14 is shown defining a single representative frequency channel. Further, each base station may broadcast in each of its coverage areas, on each of its frequency channels, a specification of the one or more frequency channels of the coverage area. For instance, in the LTE RAN, each eNodeB may broadcast a System Information Block #5 (SIB5) message that includes such a frequency channel list. And in the CDMA RAN, each BTS may broadcast a Channel List Message (CLM) that includes such a frequency channel list.

Each illustrated RAN then further includes network infrastructure that helps enable the RAN to serve UEs. For example, the LTE RAN 12 includes a mobility management entity (MME) 20 that functions as a controller for the LTE RAN, and a gateway system 22, including a serving gateway (SGW) 24 and a packet gateway (PGW) 26, that provides connectivity with a packet-switched network 28 such as the Internet. As shown, the MME has an interface for communication with each of the eNodeBs 16 and an interface for communication with the gateway system 22. With this arrangement, the MME can manage registration of UEs with the LTE RAN, paging of UEs served by the LTE RAN, and setup of bearer tunnels for UEs served by the LTE RAN to allow those UEs to engage in packet data communication on network 28.

CDMA RAN 14, on the other hand, includes a mobile switching center (MSC) 30 that functions as a controller of the CDMA RAN and that also functions to provide connectivity with the PSTN 32. As shown, MSC 30 has an interface for communication (typically through a base station controller or radio network controller (not shown)) with the BTS 18. With this arrangement, the MSC can manage registration of UEs with the CDMA RAN, paging of UEs served by the CDMA RAN, and setup of PSTN calls for UEs served by the PSTN RAN.

Further shown in FIG. 1 is a functional node known as an interworking server (IWS) 34, which may be provided for passing signaling between the LTE RAN and the CDMA RAN, to facilitate CSFB and other functions. In practice, the IWS 34 may be provided as a function or element of one of the RANs. For instance, the IWS may be a function of MSC 30.

In a representative implementation, LTE RAN 12 and CDMA RAN 14 may be owned and operated by a common wireless service provider, and the service provider may configure the RANs to interwork with each other via IWS 34, to facilitate CSFB or other such functionality. Alternatively, the RANs may be owned and/or operated by separate wireless service providers, and those wireless service providers may have an agreement with each other to allow for interworking between the RANs. Alternatively, the IWS and any such interworking between the RANs could be omitted.

Further shown in FIG. 1 is a representative UE 36 positioned in coverage of both the LTE RAN 12 and the CDMA RAN 14. Optimally, such a UE may be configured to support being served concurrently by both the LTE RAN and the CDMA RAN. For instance, the UE may be a dual-radio device, having both an LTE radio that the UE can use to be served by the LTE RAN, and a CDMA radio that the UE can use concurrently to be served by the CDMA RAN. Alternatively, the UE may include a single radio that supports both LTE service and CDMA service and that the UE can use to be served concurrently by both RANs.

In line with the discussion above, when UE 36 first powers on or arrives in coverage of the LTE RAN 12, the UE may scan for the best available LTE coverage, such as by tuning to various frequency channels and evaluating reference signal strength in search of a strongest reference signal. Upon finding such coverage of the LTE RAN, the UE may then transmit to the eNodeB that provides the coverage an attach request message, which the eNodeB may forward to the MME 20. The MME may then authenticate and authorize the UE and record the fact that the UE is present in a particular coverage area of the LTE RAN 12, so as to facilitate paging the UE if and when necessary. And the MME may engage in further signaling with the eNodeB and the gateway system to set up one or more bearer tunnels for the UE. Further, the MME may also engage in signaling with the IWS 34 to trigger registration of the UE with the CDMA RAN, so as to facilitate CSFB functionality.

Initially in this process, the UE may thereby enter into a connected mode served by the LTE RAN, in which the UE may engage in bearer communication served by the LTE RAN. Further, when the UE is not engaging in such bearer communication, the UE may instead be served in an idle mode by the LTE RAN, in which the UE monitors for page messages and the like. And the UE may further transition between the idle and connected modes as appropriate.

As discussed above, while the UE is being served by the LTE RAN, the UE may continue to scan for optimal LTE coverage, possibly in response to threshold poor coverage on the LTE's currently serving coverage area and frequency channel, or possibly as a regular scanning process. In practice, to carry out this scanning process, the UE may determine various frequency channels defined by the LTE RAN at the UE's current location, and the UE may then tune to each such frequency channel in search of coverage.

The UE may determine the frequency channels defined by the LTE RAN at the UE's location in various ways. For example, the UE could read the SIBS message broadcast by the UE's serving eNodeB to determine the frequency channels on which that eNodeB operates. Further, the UE could scan one or more such frequency channels in search of other coverage areas, such as coverage areas adjacent to the UE's currently serving coverage area, and may read the SIBS message broadcast in each such other coverage area to determine frequency channels on which the coverage area operates. Alternatively, the UE's currently serving eNodeB could broadcast for receipt by the UE, or otherwise provide to the UE, a specification of various frequency channels in use by the eNodeB and by one or more adjacent eNodeBs. Still alternatively, the UE may be provisioned with a table or other data that lists the frequency channels defined by the LTE RAN in various regions, and the UE could determine its current region such as based on the UE's currently serving eNodeB and may then refer to that data to determine the frequency channels defined by the LTE RAN at or around the UE's current location. Other examples are possible as well.

In practice, as the UE is served by the LTE RAN, the UE may also transmit regular radio environment measurement reports to the LTE RAN, which the UE's serving eNodeB may be configured to pass along to the MME. Such measurement reports may specify downlink air interface signal performance that the UE detects from its serving eNodeB as well as similar metrics for one or more other detected frequency channels. Examples of such measurements include reference signal receive power (RSRP) and reference signal receive quality (RSRQ). In addition, as discussed above, in the event the UE finds sufficiently better LTE coverage, the UE may then engage in signaling with the LTE RAN to facilitate transition of the UE to be served by the LTE RAN with that other coverage.

In line with the discussion above, while the UE is served by the LTE RAN (e.g., in the idle and/or connected mode), the UE may begin to be served by the CDMA RAN. By way of example, if the UE seeks to place a circuit-switched voice call or the CDMA RAN seeks to page the UE for a circuit-switched voice call, the UE may engage in CSFB signaling with the MSC 30 through the LTE RAN and the IWS. The MSC may then assign a CDMA air interface traffic channel for use by the UE to engage in the call, and the UE may then begin to be served by the CDMA RAN in an active mode to engage in the call over the CDMA air interface. As another example, while the UE is being served by the LTE RAN, the UE may autonomously scan for CDMA coverage and begin to be served in an idle mode by the CDMA RAN. Further, the UE may similarly transition between idle and active modes of CDMA service.

At issue in accordance with the present disclosure is then whether the UE should continue to scan for coverage of the LTE RAN, or more generally whether the UE should continue to be served by the LTE RAN, when the UE begins to be served by the CDMA RAN.

As discussed above, this issue can be resolved based at least in part on a consideration of the extent to which the UE would likely engage in scanning for coverage of the LTE RAN while being served by the CDMA RAN. If the UE would likely engage in more than a threshold extent of scanning for coverage of the LTE RAN while being served by the CDMA RAN, then the resolution may be that the UE should not continue to scan for coverage of the LTE RAN while being served by the CDMA RAN. Whereas, if the UE would not likely engage in more than the threshold extent of scanning for coverage of the LTE RAN while the UE is being served by the CDMA RAN, then the resolution may be that the UE will continue to scan for coverage of the LTE RAN while being served by the CDMA RAN.

Figure 2:
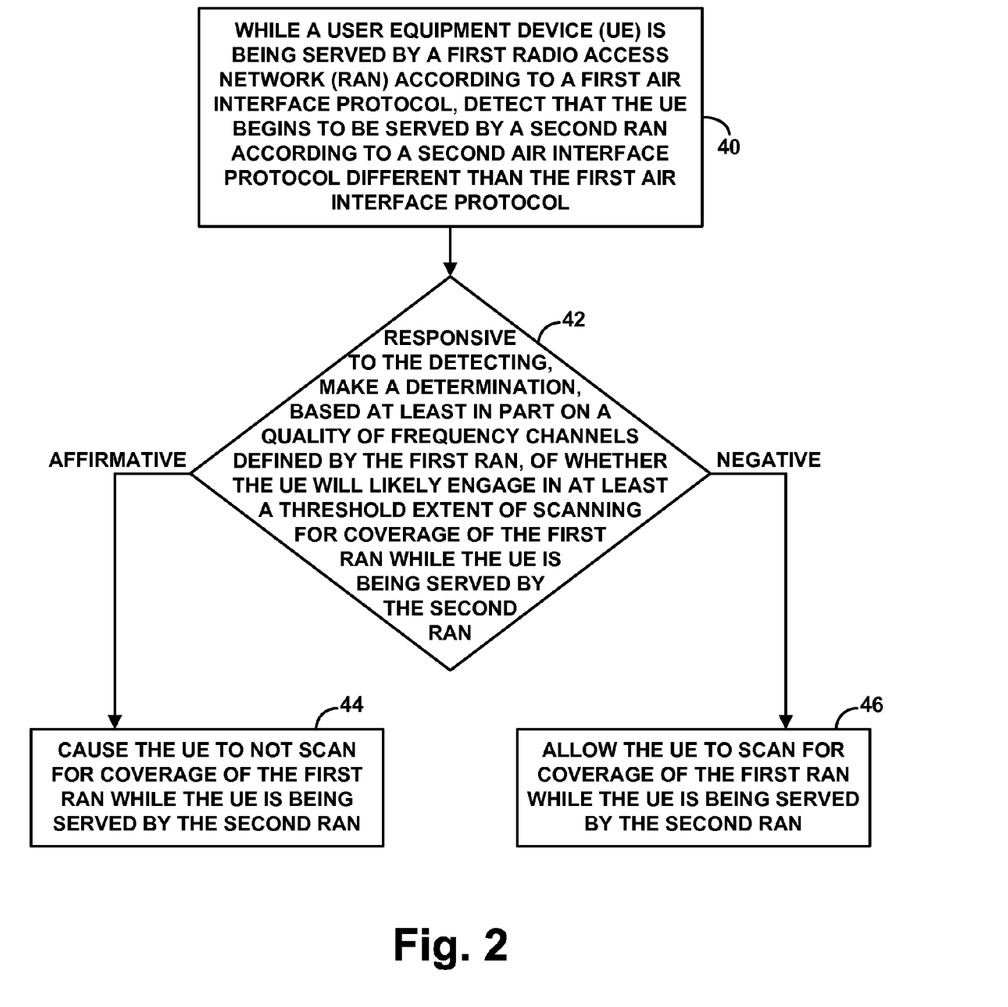
FIG. 2 is a flow chart depicting example functions that can be carried out in accordance with the disclosure.

FIG. 2 is a flow chart depicting a method for application of this analysis in practice, to control whether or not a UE will continue to scan for coverage of a first RAN, such as the LTE RAN 12, when the UE begins to be served by a second RAN, such as the CDMA RAN 14. In practice, the functions of this method can be carried out by the UE and/or by another entity such as MME 20 for instance.

As shown in FIG. 2, at block 40, while the UE is being served by the first RAN (e.g., LTE RAN 12) according to a first air interface protocol (e.g., LTE), the method involves detecting that the UE begins to be served by a second RAN (e.g., CDMA RAN 14) according to a second air interface protocol (e.g., CDMA) different than the first air interface protocol. For example, in the arrangement of FIG. 1, the UE may detect that it begins to be served by the CDMA RAN, by the UE beginning to operate on the CDMA air interface in an idle or active mode, or by detecting another event associated with the beginning of such activity. As another example, the MME may detect that the UE begins being served by the CDMA RAN by the MME forwarding CSFB signaling between the UE and the CDMA RAN that indicates the UE is about to begin engaging in a CSFB call served by the CDMA RAN.

At block 42, the method then involves, responsive the detecting done at block 40, making a determination, based at least in part on a quantity of frequency channels defined by the first RAN, of whether the UE will likely engage in at least a threshold extent of scanning for coverage of the first RAN while the UE is being served by the second RAN.

In practice, for instance, this may involve determining the quantity of frequency channels defined by the first RAN and making the determination based at least in part on that determined quantity. For example, in the arrangement of FIG. 1, when the UE is served in a coverage area provided by an eNodeB of the LTE RAN, the UE may determine how many frequency channels are specified by one or more SIBS messages that the UE may read as discussed above or by other such data available to the UE. The UE may then determine whether that quantity is greater than a predefined threshold. As another example, the MME may include or have access to data specifying frequency channels defined by the LTE RAN in the coverage area where the UE is currently operating and/or in one or more adjacent coverage areas, so the MME may refer to such data to determine the quantity of frequency channels. And the MME may similarly determine whether that quantity is greater than a particular threshold.

Alternatively or additionally, this may involve determining, as the quantity, how many frequency channels of the first RAN tend to be scanned at the location of the UE, by considering past scanning records. For example, the UE may keep a record of the number of frequency channels that the UE tends to scan (e.g., until finding sufficient other coverage) on a per location basis, such as per serving base station or per geographic location specifically. In a given instance, the UE may then determine its own current location and refer to its records to determine the quantity of frequency channels it has tended to scan at that location. The UE may then determine whether that quantity is greater than a particular threshold. As another example, the UE and/or one or more other UEs could report such scanning history data to the MME, and the MME may thus determine the quantity based on the UE'S current location and determine whether that quantity is greater than a particular threshold.

The threshold quantity of frequency channels that forms the basis for determining whether the UE is likely to engage in at least a threshold extent of scanning for coverage of the first RAN can be predefined by engineering design (e.g., ten channels, fifteen channels, or some other number of channels). Alternatively, the threshold could be set dynamically based on one or more factors.

Continuing with reference to FIG. 2, if the determination at block 42 is affirmative (i.e., that the UE is likely to engage in at least a threshold extent of scanning for coverage of the first RAN while the UE is being served by the second RAN), then the method continues at block 44, where the method involves causing the UE to not scan for coverage of the first RAN while the UE is being served by the second RAN. Whereas, if the determination at block 42 is negative (that the UE is not likely to engage in at least a threshold extent of scanning for coverage of the first RAN while the UE is being served by the second RAN), then the method continues at block 46, wherein the method involves instead allowing the UE to scan for coverage of the first RAN while the UE is being served by the second RAN.

In practice, the function of causing the UE to not scan for coverage of the first RAN while the UE is being served by the first RAN may take various forms. For example, the function may involve directing a radio of the UE to stop such scanning while still being served by the first RAN. As another example, the function may involve directing a radio of the UE to detach from the first RAN so as to stop being served by the first RAN, which would include stopping the UE from scanning for coverage of the first RAN. And as still another example, the function may involve directing a radio of the UE to power down so as to stop communicating with the first RAN altogether.

A controller in the UE may provide such directives to a correspondingly programmed radio of the UE that the UE uses to be served by the first RAN, and the radio may respond accordingly. Alternatively, a controller of the first RAN could transmit a directive to the UE via the UE's serving base station, and the UE may respond accordingly. For instance, an MME of the LTE RAN could transmit to the UE a directive for the UE to detach from the LTE RAN, and the UE may respond accordingly by detaching and no longer being served by the LTE RAN.

On the other hand, the function of allowing the UE to scan for coverage of the first RAN while the UE is being served by the second RAN may simply involve not causing the UE to stop such scanning. Thus, through normal operation as discussed above, as the UE is still served by the first RAN, the UE may continue to scan for coverage of the first RAN, as the UE is concurrently served by the second RAN.

Figure 3:
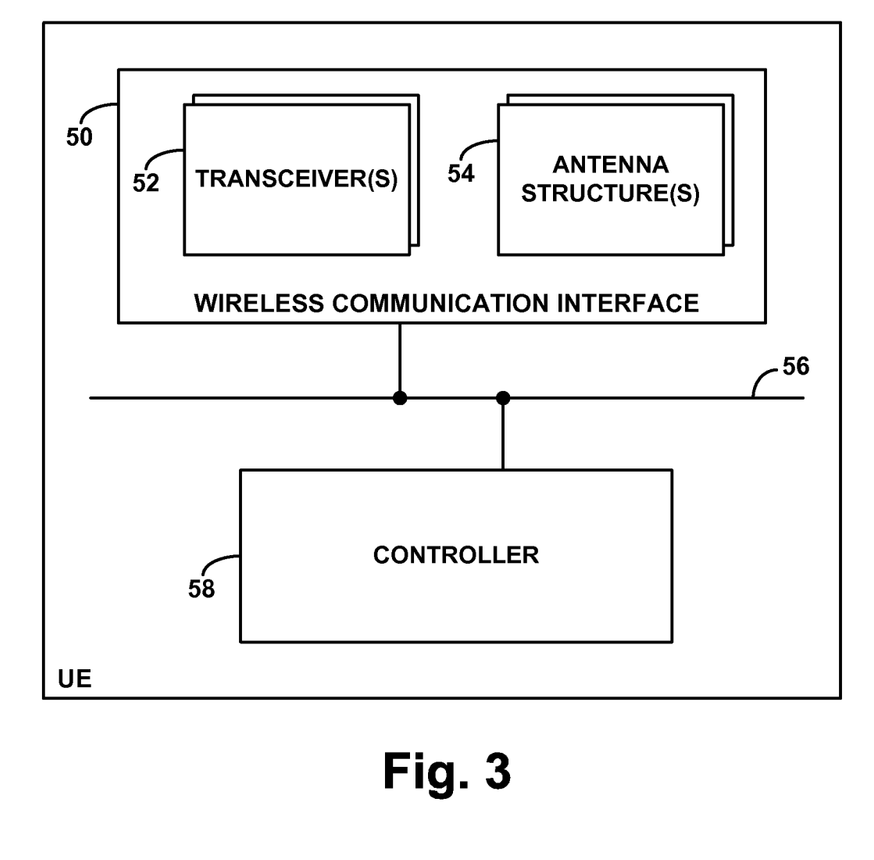
FIG. 3 is a simplified block diagram of an example UE operable in accordance with the disclosure.

FIG. 3 is next a simplified block diagram of an example UE operable in accordance with the present disclosure. The UE may be any of a variety of devices, whether or not technically operated by a "user." As shown in FIG. 3, the example UE includes a wireless communication interface 50 (shown including one or more transceivers 52 and one or more antenna structures 54) and a controller 56, all of which may be coupled together by a system bus, network, or other connection mechanism 58.

In practice, the wireless communication interface 50 may include one or more radios, such as a first radio configured for the UE to be served by a first RAN according to a first air interface protocol, including scanning for coverage of the first RAN, and a second radio configured for the UE be served by a second RAN according to a second air interface protocol different than the first air interface protocol.

Further, the controller 56 may take various forms, including various combinations of hardware, firmware, and/or software (e.g., a processing unit programmed with machine language instructions), and may be configured to cause the UE to carry out various functions described herein. For instance, the controller may be configured to detect, while the UE is served by the first RAN, that the UE begins to be served by the second RAN, and, responsive to the detecting, (i) to make a determination of whether a quantity of frequency channels defined by the first RAN is at least a threshold quantity, and (ii) based at least in part on the determination being affirmative, to stop the first radio from scanning for coverage of the first RAN.

Figure 4:
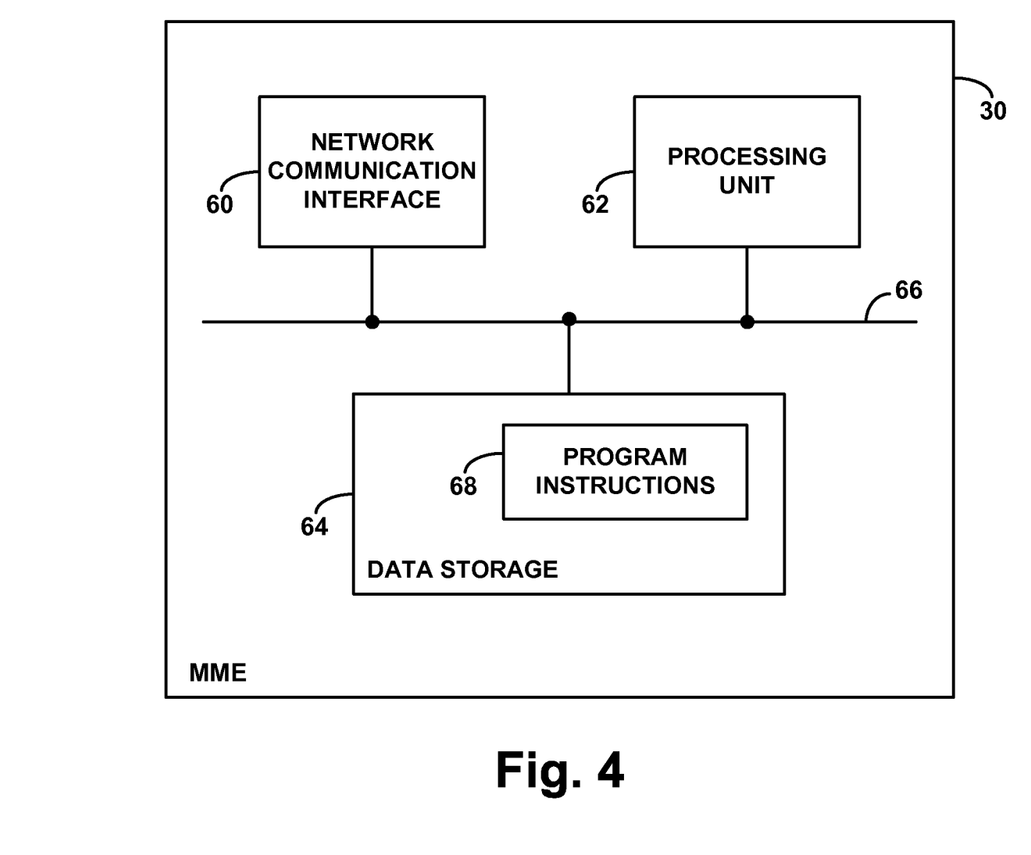
FIG. 4 is a simplified block diagram of an example network controller operable in accordance with the disclosure.

Finally, FIG. 4 is a simplified block diagram of an example network controller such as MME 20, showing some of the functional components that may be included in such an entity to facilitate operation in accordance with the present disclosure. As shown, the example network controller includes a network communication interface 60, a processing unit 62, and non-transitory data storage 64, all of which may be communicatively linked together by a system bus, network, or other connection mechanism 66.

Network communication interface 60 functions to facilitate communication with various other network entities shown of the network. As such, the interface 60 may include one or more network interface modules, such as Ethernet network interface modules for instance, supporting wireless and/or wired communication with these and other components.

Processing unit 62 may then comprise one or more general purpose processors (such as microprocessors) and/or one or more special purpose processors (e.g., application specific integrated circuits). And data storage 64 may comprise one or more volatile and/or non-volatile storage components, such as optical, magnetic, or flash storage, and may be integrated in whole or in part with processing unit 62. And data storage 64 may then hold program instructions 68, which may be executable by processing unit 62 to carry out various functions described herein.

Exemplary embodiments have been described above. Those skilled in the art will understand, however, that changes and modifications may be made to these embodiments without departing from the true scope and spirit of the invention.

We claim:

1. A method comprising:

while a user equipment device (UE) is being served by a first radio access network (RAN) according to a first air interface protocol, detecting that the UE begins to be served by a second RAN according to a second air interface protocol different than the first air interface protocol;

responsive to the detecting, making a determination, based at least in part on a quantity of frequency channels defined by the first RAN, of whether the UE will engage in at least a threshold extent of scanning for coverage of the first RAN while the UE is being served by the second RAN;

if the determination is that the UE will engage in at least the threshold extent of scanning for coverage of the first RAN while the UE is being served by the second RAN, then causing the UE to not scan for coverage of the first RAN while the UE is being served by the second RAN; and if the determination is that the UE will not engage in at least the threshold extent of scanning for coverage of the first RAN while the UE is served by the second RAN, then allowing the UE to scan for coverage of the first RAN while the UE is being served by the second RAN.

2. The method of claim 1, wherein making the determination, based at least in part on the quantity of frequency channels defined by first RAN, of whether the UE will engage in at least the threshold extent of scanning for coverage of the first RAN while the UE is being served by the second RAN comprises:

determining the quantity of frequency channels defined by the first RAN; and making the determination based at least in part on the determined quantity.

3. The method of claim 2, wherein the UE is served in a coverage area provided by a base station of the first RAN, and wherein the quantity of frequency channels includes one or more frequency channels defined by the coverage area.

4. The method of claim 3, wherein the coverage area is a first coverage area, and wherein the first RAN provides one or more coverage areas adjacent to the first coverage area, and wherein the quantity of frequency channels further includes one or more frequency channels defined by the one or more adjacent coverage areas.

5. The method of claim 2, wherein the quantity of frequency channels is a quantity of frequency channels at a current location of the UE.

6. The method of claim 1, wherein making the determination, based at least in part on the quantity of frequency channels defined by first RAN, of whether the UE will engage in at least the threshold extent of scanning for coverage of the first RAN while the UE is being served by the second RAN comprises:

determining a current location of the UE;

determining, as the quantity of frequency channels, how many frequency channels of the first RAN tend to be scanned at the determined location of the UE; and making the determination based on the determined quantity.

7. The method of claim 1, wherein the UE has a first radio for being served by the first RAN according to the first air interface protocol and a second radio for being served by the second RAN according to the second air interface protocol, and wherein causing the UE to not scan for coverage of the first RAN while being served by the second RAN comprises causing the UE to turn off the first radio but to keep on the second radio.

8. The method of claim 1, wherein the UE is attached to the first RAN, and wherein causing the UE to not scan for coverage of the first RAN while being served by the second RAN comprises causing the UE to detach from the first RAN.

9. The method of claim 1, carried out by the UE.

10. The method of claim 1, carried out by a controller of the first RAN.

11. The method of claim 1, wherein the first RAN is a Long Term Evolution (LTE) RAN, wherein the second RAN is a circuit-switched-fallback (CSFB) RAN, and wherein detecting that the UE begins to be served by the second RAN comprises detecting transition of the UE to engage in a CSFB call served by the CSFB RAN.

12. A user equipment device (UE) comprising:

a first radio configured for the UE to be served by a first radio access network (RAN) according to a first air interface protocol, wherein the first radio scans for coverage of the first RAN;

a second radio configured for the UE be served by a second RAN according to a second air interface protocol different than the first air interface protocol; and a controller configured to manage operation of at least the first radio, wherein the controller is configured to detect, while the UE is served by the first RAN, that the UE begins to be served by the second RAN, and, responsive to the detecting, (i) to make a determination of whether a quantity of frequency channels defined by the first RAN is at least a threshold quantity, and (ii) based at least in part on the determination being affirmative, to stop the first radio from scanning for coverage of the first RAN.

13. The UE of claim 12, wherein stopping the first radio from scanning for coverage of the first RAN comprises powering off the first radio.

14. The UE of claim 12, wherein the first radio is attached to the first RAN, and wherein stopping the first radio from scanning for coverage of the first RAN comprises causing the first radio to detach from the first RAN.

15. The UE of claim 12, wherein making the determination of whether the quantity of frequency channels defined by the first RAN is at least the threshold quantity comprises:

determining the quantity of frequency channels defined by the first RAN; and determining whether the determined quantity of frequency channels is at least the threshold quantity.

16. The UE of claim 15, wherein determining the quantity of frequency channels defined by the first RAN comprises determining the quantity based at least in on part on channel list data broadcast by one or more base stations of the first RAN.

17. The UE of claim 15, wherein determining the quantity of frequency channels defined by the first RAN comprises determining the quantity based on past scanning of frequency channels of the first RAN by the UE.

18. A control server in a first radio access network (RAN), the control server comprising:

a processing unit;

data storage; and program instructions stored in the data storage and executable by the processing unit to carry out functions comprising (i) detecting that a user equipment device (UE) being served by the first RAN begins being served by a second RAN, (ii) responsive to the detecting, making a determination of whether a quantity of frequency channels defined by the first RAN at a current location of the UE is at least a threshold quantity, and (iii) responsive to the determination being affirmative, causing the UE to stop being served by the first RAN.

19. The control server of claim 18, wherein causing the UE to stop being served by the first RAN comprises sending a detach request to the UE.

20. The control server of claim 18, wherein the first RAN is a Long Term Evolution (LTE) RAN, the control server is a Mobility Management Entity (MME), and the second RAN is a circuit-switched fallback (CSFB) RAN.

* * * * *